Feb. 20, 1923.
W. S. LUTZ.
MACHINE FOR CUTTING OIL GROOVES.
FILED DEC. 30, 1920.
1,445,898.
Fig. 1.
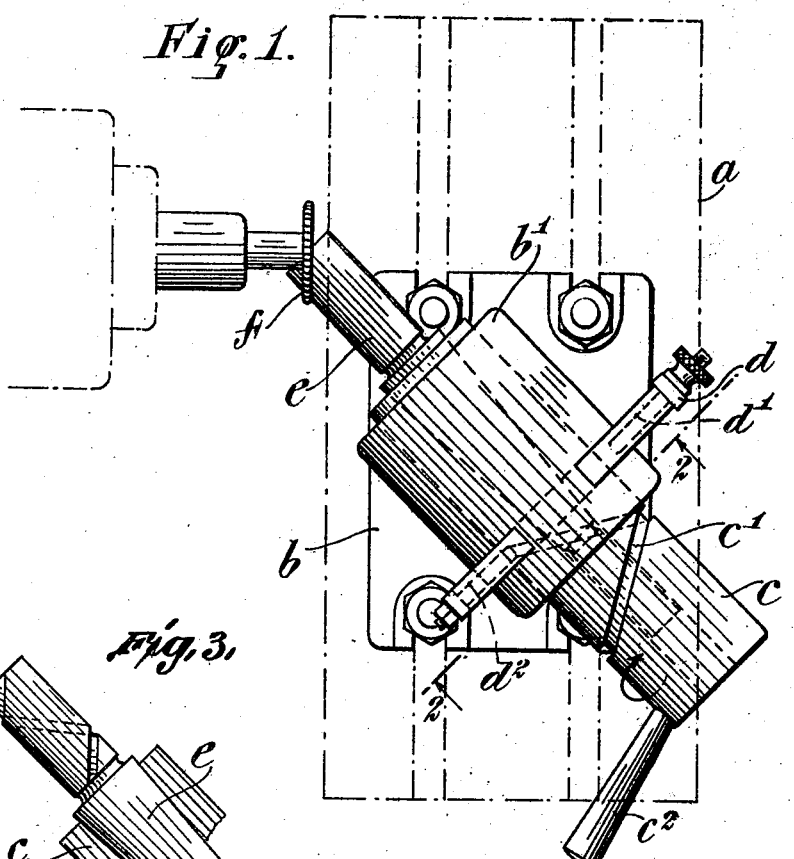
Fig. 3.
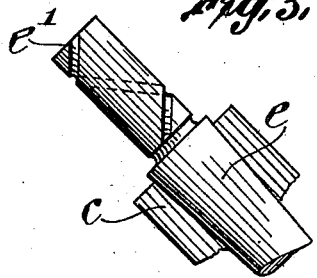
Fig. 4.
Fig. 2.
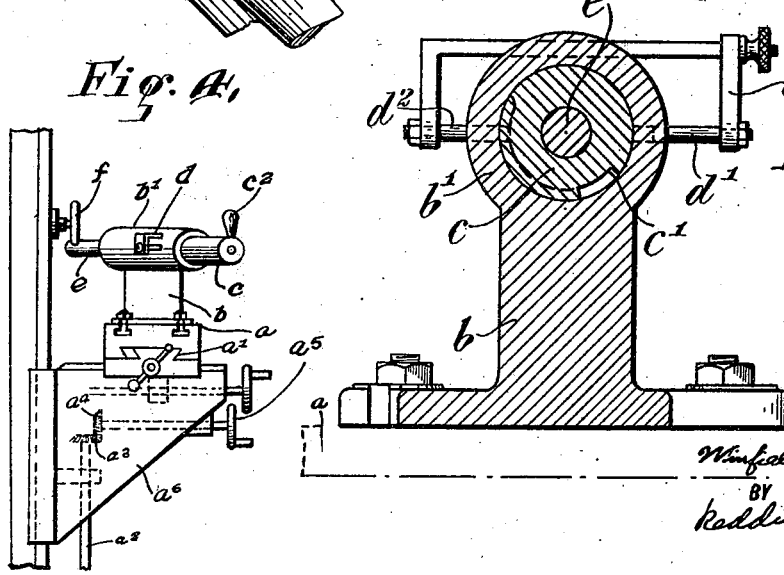
INVENTOR
Winfield Scott Lutz
BY
Redding & Greeley
ATTORNEYS Patented Feb. 20, 1923.

1,445,898

UNITED STATES PATENT OFFICE.

WINFIELD SCOTT LUTZ, OF ALLENTOWN, PENNSYLVANIA, ASSIGNOR TO INTERNATIONAL MOTOR COMPANY, OF NEW YORK, N. Y., A CORPORATION OF DELAWARE.

MACHINE FOR CUTTING OIL GROOVES.

Application filed December 30, 1920. Serial No. 434,088.

*To all whom it may concern:*

Be it known that I, WINFIELD SCOTT LUTZ, a citizen of the United States, residing in Allentown, in the State of Pennsylvania, have invented certain new and useful Improvements in Machines for Cutting Oil Grooves, of which the following is a specification, reference being had to the accompanying drawing, forming a part hereof.

This invention relates to a fixture for facilitating the cutting of oil grooves and is described herein with reference to the application of such a fixture to a milling cutter of any approved form and to the cutting of grooves on pins, spindle rods or the like.

In accordance with the best practise it is desirable to cut pins, such as may be used in steering knuckles, for instance, with at least two oil grooves which extend around the pin for say, 360°, and throughout the length of the bearing surface, so as to distribute oil thereunder. Difficulty has been experienced in cutting these grooves with any degree of ease and accuracy, since it is very difficult to hold a round pin, bar or the like in proper relation to a cutting tool and prevent the turning of the pin during the cutting on its periphery. The present invention has for its principal object to provide a fixture of simple construction which can readily be adapted to machines of improved type and will facilitate the quick, accurate and inexpensive cutting of oil grooves of any length and angularity of the periphery of any parts and particularly round parts. A further object is to provide in such a fixture an adapter of simple form which holds the work against rotation, permits its ready introduction and withdrawal, and moves in the fixture in such relation to the cutter as to constantly cause the cutter to maintain the work in the adapter. The improved adapter further permits the cutting of more than one oil groove on a round piece of work and at any angular displacement with respect to any other groove thereon as may be predetermined. Still another object of the invention is to provide a fixture which may receive adapters of different forms by a very simple manipulation of the operator so that where tapered work is being operated on it may be assured that the cutter will move against the work in such manner as to maintain it in the adapter.

These and other objects will appear with greater particularity hereinafter in connection with the detailed description of the approved embodiment of the invention illustrated in the drawing, wherein—

Figure 1 is a view in plan showing the improved structure applied to a milling cutter.

Figure 2 is a view in transverse section through the fixture and adapter shown in Figure 1.

Figure 3 is a view somewhat schematic showing an oil groove cut on a pin and extending entirely around its circumference.

Figure 4 is a view in side elevation showing the mechanism for elevating the improved structure.

The head $a$ of an approved type of machine is shown slidably mounted in ways $a'$ and has mounted thereon the improved fixture $b$ on which the work is to be carried and presented properly to a milling cutter $f$, all in a manner generally practised. The head $a$ is preferably reciprocable in a vertical plane in order that the work may be carried to and from the cutter $f$ as may be desirable. The mechanism for elevating the head, as illustrated in Figure 4, comprises a screw shaft $a^2$. This shaft carries a pinion $a^3$ with which meshes the pinion $a^4$. Rotation of the handle $a^5$ causes elevation of the screw shaft and its standard $a^6$.

The fixture $b$ has formed therein a cylindrical bearing $b'$ into which may be inserted a circular adapter $c$ formed on its exterior with a spiral groove $c'$ which, in the present embodiment, extends around the adapter for a distance of 360°. On the end of the adapter is secured a handle $c^2$ for convenient manipulation in a manner which will later appear. On the fixture $b$ and preferably on the bearing section $b'$ thereof is mounted transversely a reciprocable head $d$ having axially alined but opposed studs $d'$, $d^2$ which preferably fall on a diameter of the adapter $c$ and, by reciprocation, may be moved into and out of the bore of the bearing $b'$, in alternation, it being possible to place the frame $d$ in such position that neither one of the studs $d'$, $d^2$ enters the bore of the bearing, but impossible to place the frame so that both of the studs enter the bore at one time.

The interior of the adapter $c$ is bored in such manner as to form a suitable chuck to receive the work to be grooved. In the illustrated embodiment the bore is tapered since it is proposed to groove pins $e$ for steering knuckles which pins, intermediate their bearing ends, are tapered.

The advantages of the improved machine and its features of construction may be best understood with reference to a description of its operation. The operator by moving the frame $d$ into mid position with relation to the bore of the bearing $b'$ arrests the studs $d'$, $d^2$ in such positions that they do not enter the bore. The adapter $c$ can then be withdrawn axially from the fixture. The operator inserts a pin $e$ with its tapered section engaged with the bore of the adapter and the adapter is then slid back into the bearing $b'$ so as to present the bearing end of the pin to the milling cutter $f$. The operator then slides the frame $d$ to the right, as viewed in the drawing, so as to move the stud $d^2$ into engagement with the groove $c'$, the operator moving the adapter meanwhile until he can "feel" the complete engagement of the stud $d^2$ with the groove. The groove $c'$ on the adapter $c$ is so placed, considering the length of the pin $e$ and other factors that when the stud $d^2$ is at the forward end of the groove the cutter $f$ will be in line with the extreme end of the pin. After the operations described, the head $a$ can be raised to bring the pin into engagement with the cutter, so that the cutter may form a groove of any desired depth. The operator by rotating the adapter $c$ in a clockwise direction, as viewed in Figure 1, will cause the rotation of the pin $e$ so that the cutter $f$ will operate about its periphery and the engagement of the stud $d^2$ with the groove $c'$ will simultaneously cause axial movement of the adapter $c$ and the pin $e$ towards the cutter. The taper of the pin $e$, as viewed in Figure 1, is such that this axial movement is opposed to the direction of rotation of the cutter and the action of the cutter is such as to maintain the pin firmly on its tapered seat. This causes the adapter to act as a chuck and to hold the pin against relative rotative movement during the cutting action. The cut made in the manner described is illustrated by the groove $e'$ shown in Figure 3. The rotation of the adapter through 360° will, of course, cause the rear end of the groove $c'$ to be brought into engagement with the stud $d^2$ and while the adapter is making one revolution, the pin will have made one revolution and a groove $e'$ extending throughout the length of the bearing portion of the pin and entirely around its circumference will have been cut by the cutter $f$. If now, as is usual, it is desired to cut a second groove on the bearing portion of the pin and to have this second groove intersect the first groove to insure free distribution of the oil, it will be preferable to have the second groove disposed through an angle of 180° with respect to the first groove. For the second groove the operator slides the frame $d$ towards the left, as viewed in Figure 2, until the ends of the studs $d'$, $d^2$ are entirely withdrawn from the portion of the bearing $b'$. The adapter $c$ is then slid axially until it takes the position shown in Figure 1 and the cutter $f$ is disposed in line with the end of the pin $e$. The adapter $c$ is then rotated 180° so as to bring the forward end of the groove $c'$ opposite to the stud $d'$. The frame $d$ is then slid to the left, as viewed in Figure 2, to bring the stud $d'$ into engagement with the forward end of the groove $c'$. By then raising the head $a$ again the cutter will be brought into engagement with the periphery of the bearing end of the pin but at 180° from the point at which the first cut was commenced. By rotating the adapter $c$ in a clockwise direction, as in the first cut and through an angle of 360°, the second groove will be cut throughout the length of the bearing end of the pin $e$ and entirely about its periphery intersecting the first groove at about the mid-section of the groove.

The cutting operations described are very simple. The operator is enabled to groove a great number of pins in a very short time, the interval between cuts being only necessary to manipulate the adapter in the manner described. If now it is desired to cut similar oil grooves on the bearing surface at the other end of such a pin as $e$, it is necessary to manipulate the frame $d$ so as to withdraw the studs $d'$, $d^2$ from engagement with the adapter $c$ and withdraw the adapter. The pin $e$ must then be removed from the adapter and a different adapter employed which will give such form as to permit the other end of the pin $e$ to project beyond its end and be presented to the cutter. It is proposed again that the groove in such an adapter shall be in such relation to the studs and to the cutter and to the tapered bore of the adapter as to insure that axial movement of the adapter will serve to jam the pin more firmly on to its tapered seat.

I claim as my invention:

In a machine for cutting oil grooves in pins for steering knuckles, the combination with a vertically reciprocable head and a rotary cutter, a fixture mounted adjustably on the head and having a bearing whose bore is inclined to the axis of the cutter, an adapter movably mounted in said bearing and formed with a tapered portion for engagement with a tapered portion of the pin, a frame journaled transversely of the bearing and carrying diametrically opposed studs movable alternately into the bore of said bearing, said adapter being formed with a spiral groove exteriorly to receive one or the other of said studs upon reciprocation of the frame, and means to rotate the adapter.

This specification signed this 23 day of December, A. D. 1920.

WINFIELD SCOTT LUTZ.